United States Patent
Annen et al.

(10) Patent No.: US 10,684,140 B2
(45) Date of Patent: Jun. 16, 2020

(54) OPTOELECTRONIC MEASURING DEVICE AND METHOD FOR DISTURBANCE DETECTION

(71) Applicant: Safran Vectronix AG, Heerbrugg (CH)

(72) Inventors: Ivo Annen, Schindellegi (CH); Marzell Schiller, Lindau (DE)

(73) Assignee: Safran Vectronix AG, Heerbrugg (CH)

( * ) Notice: Subject to any disclaimer, the term of this patent is extended or adjusted under 35 U.S.C. 154(b) by 731 days.

(21) Appl. No.: 15/202,820

(22) Filed: Jul. 6, 2016

(65) Prior Publication Data
US 2017/0010127 A1 Jan. 12, 2017

(30) Foreign Application Priority Data
Jul. 6, 2015 (EP) .................... 15175416

(51) Int. Cl.
| | |
|---|---|
| G01C 25/00 | (2006.01) |
| F41G 3/02 | (2006.01) |
| F41G 3/06 | (2006.01) |
| F41G 3/32 | (2006.01) |
| G01B 21/00 | (2006.01) |
| G01C 3/08 | (2006.01) |
| G01C 17/02 | (2006.01) |
| G01C 17/38 | (2006.01) |
| G08B 3/10 | (2006.01) |

(Continued)

(52) U.S. Cl.
CPC .............. *G01C 25/00* (2013.01); *F41G 3/06* (2013.01); *G01B 21/00* (2013.01); *G01C 3/08* (2013.01); *G01C 17/02* (2013.01); *G08B 3/10* (2013.01); *G08B 6/00* (2013.01); *G08B 29/14* (2013.01); *G08B 31/00* (2013.01)

(58) Field of Classification Search
CPC .......... G01C 25/00; G01C 3/08; G01C 17/02; G01C 17/38; F41G 3/02; F41G 3/06; F41G 3/32; G01B 21/00; G08B 3/10; G08B 6/00; G08B 29/14; G08B 31/00
USPC .................... 702/151, 85, 92, 93, 94, 95
See application file for complete search history.

(56) References Cited

U.S. PATENT DOCUMENTS

| | | |
|---|---|---|
| 4,949,089 A | 8/1990 | Ruszkowski, Jr. |
| 6,539,639 B2 | 4/2003 | Smith |

(Continued)

FOREIGN PATENT DOCUMENTS

DE 196 09 762 C1 4/1997

*Primary Examiner* — Michael P Nghiem
*Assistant Examiner* — Dacthang P Ngo
(74) *Attorney, Agent, or Firm* — Muncy, Geissler, Olds & Lowe, P.C.

(57) ABSTRACT

The invention relates to a method (100) for monitoring the accuracy of the azimuthal orientation of a handheld optoelectronic measuring device to be determined (110) by means of an electronic magnetic compass, including an automatic ascertainment (120) of an estimated accuracy value by the measuring device based on measured data of the magnetic compass, characterized by a safety check (200), within the scope of which a probability that the estimated accuracy value meets a previously determined (140) accuracy criterion is automatically ascertained (220) by the measuring device, and the ascertained probability is provided (230) to a user as a return value. The invention also relates to a handheld optoelectronic measuring device including an electronic magnetic compass for carrying out the method according to the invention.

20 Claims, 6 Drawing Sheets

(51) Int. Cl.
  *G08B 6/00* (2006.01)
  *G08B 29/14* (2006.01)
  *G08B 31/00* (2006.01)

(56) References Cited

U.S. PATENT DOCUMENTS

| | | |
|---|---|---|
| 7,325,320 B2 | 2/2008 | Gnepf et al. |
| 7,340,362 B2 | 3/2008 | Kitamura et al. |
| 8,275,544 B1 * | 9/2012 | Wells .................. G01C 21/165 |
| | | 342/146 |
| 2005/0188556 A1 * | 9/2005 | Lee ........................ G01C 17/30 |
| | | 33/356 |
| 2010/0307015 A1 | 12/2010 | Mayor et al. |
| 2010/0312510 A1 * | 12/2010 | Piemonte ............... G01C 17/28 |
| | | 702/93 |

* cited by examiner

OPTOELECTRONIC MEASURING DEVICE AND METHOD FOR DISTURBANCE DETECTION

CROSS-REFERENCE TO RELATED APPLICATIONS

This application claims priority to European Patent Application No.: 15175416.5, which was filed in Europe on Jul. 6, 2015, and which is herein incorporated by reference in its entirety.

BACKGROUND OF THE INVENTION

The present invention relates to a handheld optoelectronic measuring device, in particular a sighting device, including an electronic magnetic compass for determining the azimuthal orientation of the measuring device, and a method for determining an expected accuracy of the azimuthal orientation of a measuring device including a magnetic compass. According to the present invention, by means of the measuring device, it is automatically detected if the expected accuracy is too low, in particular if a new compensation must be carried out, and at least one warning message is given to the user.

Such measuring devices are used for determining coordinates of distant objects, for example in object recording and data collection for geographical information systems (GIS). Such measuring devices may also be in the form of portable sighting devices which are used in particular for determinations of coordinates of military target objects, as described, for example, in U.S. Pat. No. 7,325,320 B2.

Such a determination of target coordinates requires the relative coordinates between the measuring device and the target object. For this purpose, the sighting device is aligned with the target object, and the azimuthal orientation and the zenith orientation of the sighting device relative to the Earth are then determined. The angle values determined can then be provided, together with a typical accuracy value in each case, at a data interface of the sighting device for transmission to a firing control post. From the firing control post, the firing activity can then be introduced via a firing unit into an area associated with the transmitted target coordinates.

With regard to the achievable accuracy of the target coordinates to be determined, the magnetic compass is the critical component. On the basis of the transmitted accuracy value of the azimuthal orientation, it is possible on the one hand to assess the effect of firing activity to be introduced on the target object, and on the other hand, to assess the probability of collateral damage. In the case of a substantial difference between the effective and the specified typical accuracy value, this assessment may be incorrect.

Even with an electronic magnetic compass, considerable caution is still advisable in the determination of azimuthal orientations, although the components of the magnetic and gravitational fields are measurable as such with sufficient device accuracy. As disclosed in U.S. Pat. No. 4,949,089, today, it is possible to take into account the declination of the Earth's magnetic field from geographic north virtually automatically by means of the magnetic variation compensation implemented in military GPS receivers. Since, however, in addition to the Earth's magnetic field, which is the medium for information relating to the north direction, the measured magnetic field as a rule includes stray magnetic fields superposed thereon, the azimuthal orientation relative to geographic north can nevertheless often only be determined with very limited accuracy and reliability, which may be several times the accuracy of the device itself.

These stray magnetic fields comprise stationary stray fields associated with the measuring location and stray fields which relate to the device itself and are due to electrical currents and magnetically hard and magnetically soft materials of the device in which the magnetic compass is installed. Stationary stray fields can moreover be divided into stray fields of regional scale and stray fields of local scale.

Stray fields of regional scale, so-called anomalies of the Earth's magnetic field, are as a rule due to natural interfering effects, for example extensive deposits of iron ore. When considered on a local scale, these stray fields are homogeneous and result locally in a constant azimuthal error comparable to the declination of the Earth's magnetic field.

On the other hand, stray fields of local scale are due to man-made objects, for example railway tracks, water pipes, overhead lines, pipelines, or structures made of steel and reinforced concrete. Quasi-stationary objects, such as parked vehicles or weapons systems brought into position, also cause stray magnetic fields of local scale. When considered on a local scale, these stray fields are inhomogeneous and cause varying azimuthal errors, even within measuring spaces with dimensions of meters, which may also vanish in some locations.

As disclosed in DE 196 09 762 C1, fixed stray fields of a device including an electronic magnetic compass which has sensors for the three-dimensional measurement of a magnetic field and a gravitational field can be arithmetically compensated by means of a vector equation when determining azimuthal orientations of the device. The parameters of the vector equation must be determined beforehand by means of an optimization method. This optimization method is based on values of a more or less rigidly specified sequence of measurements of the magnetic and gravitational fields at a measuring location. In the case of each of these measurements, the device is oriented differently in space. In this way, however, stationary stray magnetic fields can be neither compensated nor detected at the measuring location.

U.S. Pat. No. 6,539,639 B2 discloses a method in which the accuracy in the determination of an azimuthal orientation using a magnetic compass is said to be monitorable. Since such a magnetic compass has sensors for the three-dimensional measurement of the magnetic and gravitational fields, the values of the horizontal and vertical field strengths of the magnetic and gravitational fields are also obtained in the determination of an azimuthal orientation. The method is based here on a comparison of these values with stored values of the horizontal and vertical field strengths from the past in light of a specified threshold value.

The stored values of the horizontal and vertical field strengths may be attributable on the one hand to a determination of the parameters, comparable with DE 196 09 762 C1, at a different measuring location, or, on the other hand, may be obtained by averaging horizontal and vertical field strengths of past determinations of the azimuthal orientation. Since, however, there is no direct relationship between a change in the horizontal and vertical field strengths between different measuring locations and the occurrence of azimuthal errors and, on the other hand, significant azimuthal errors may occur even in the case of similar horizontal and vertical field strengths at different measuring locations, false alarms occur again and again in the case of such monitoring, or necessary warnings are not given. In addition, such a warning also contains only the information that differences of horizontal and/or vertical field strengths of a certain magnitude were determined over a certain period.

It would be helpful if information were provided to the user warning about current interfering effects. Such an error or accuracy indication with respect to the azimuth measurement is not mentioned in any of the aforementioned documents.

BRIEF SUMMARY OF THE INVENTION

The object of the present invention is therefore to remedy deficiencies of the related art, and to provide a measuring device including an electronic magnetic compass for determining the azimuthal orientation of the measuring device and a method for determining the accuracy of the azimuthal orientation to be determined of a measuring device including a magnetic compass, via which the reliability of information about the accuracy of the azimuthal orientation to be determined is increased.

An additional object of the present invention is to provide such a measuring device and a method, via which the transmission of data having an unreliability which is too high is prevented.

An additional object of the present invention is to provide such a measuring device and method, which makes it easier for a user to make decisions, in particular about the usability of ascertained data.

At least one of these objects is achieved according to the present invention via a method and an optoelectronic measuring device having the features of Patent Claim 1 or 9. Additional alternative or advantageous designs or refinements of the present invention are described in the dependent patent claims.

A handheld optoelectronic measuring device according to the present invention includes an electronic magnetic compass for determining the azimuthal orientation of the measuring device and an interface for providing a signal which is determined in particular for a firing control post. In addition to information about the already-determined azimuthal orientation of the measuring device, the signal also includes information about an expected accuracy of the determined azimuthal orientation. According to the present invention, the measuring device has means for determining the accuracy of the azimuthal orientation to be determined of the measuring device. On the one hand, the means for the determination are associated with the magnetic compass, and on the other hand, they are designed in such a way that, based on measured data of the magnetic compass, the accuracy of the measuring device may be determined automatically. In one method according to the present invention for determining an expected accuracy of the azimuthal orientation to be determined by means of an electronic magnetic compass, the expected accuracy is automatically determined by the measuring device based on measured data of the magnetic compass.

This determination makes use of the fact that the more homogeneous the stationary magnetic field is in the spatial area in which the azimuthal orientations are determined, the more reliably and more accurately azimuthal orientations may in principle be determined. A specified constant accuracy value known from the related art only unsatisfactorily depicts effective accuracies in the determination, since, in practice, large differences between stationary magnetic fields may be encountered at different measuring sites. The spectrum ranges from practically homogeneous stationary magnetic fields, for example in an area in a natural state, to highly inhomogeneous stationary magnetic fields in an urban setting.

Additional negative effects on the achievable accuracy are caused by inhomogeneities of the magnetic field, which may be caused by an operating person who aligns the measuring device with the target object and determines the relative coordinates between the target object and the measuring device.

Last but not least, the measuring device itself often has stray magnetic fields which relate to the device itself, which also additionally negatively affect the azimuthal determination if, for example, they are not compensated for according to DE 196 09 762 C1.

Information about the magnitude of an inhomogeneity of the magnetic field underlying the azimuthal determination, which the measuring device is not able to compensate, is used to determine the expected accuracy. This information may in principle be obtained in many ways from measured data of the magnetic compass.

For example, for determining the accuracy, suitable measured data could be obtained via multiple measurements of the magnetic compass on the same distant target object from directly adjacent locations. Preferably, the adjacent locations lie along the same line of sight with the sighted target object.

It would also be conceivable that multiple magnetic compasses are arranged spaced apart from each other in the measuring device. Due to the different measured data of the magnetic compasses, information about the inhomogeneity of the magnetic field to be measured could be obtained by the measuring device for determining the expected accuracy, possibly via simultaneous measurements.

In one refinement of the present invention, a measuring device including a magnetic compass having measuring sensors fixed to the device for measuring a magnetic field and the direction of the gravitational field, and a device for compensating device-related magnetically hard stray fields or magnetically hard and soft stray fields, are provided. As disclosed in DE 196 09 762 C1, using such a device, it is possible to compensate stray magnetic fields of electric currents related to the device itself, as well as magnetically hard materials or magnetically hard and soft materials related to the device itself, based on measured data of a range of measurements using a differently oriented magnetic compass in each case. Since the information necessary for compensating the stray fields also contains information about the inhomogeneity of the magnetic field underlying the measurements, the latter information may also simultaneously the be used for determining the expected accuracy of the azimuthal orientation. As a result, in the course of a compensation of stray fields related to the device itself, the expected accuracy of azimuthal determinations may also be determined. The advantages for the operation of such a measuring device and the manufacture of the same are obvious.

A first aspect of the present invention relates to a method for monitoring the accuracy of the azimuthal orientation of a handheld optoelectronic measuring device to be determined by means of an electronic magnetic compass, including an automatic determination of an expected accuracy by the measuring device based on measured data of the magnetic compass. According to the present invention, the method includes a safety check, within the scope of which a probability that the estimated accuracy value meets a previously determined accuracy criterion is automatically ascertained by the measuring device, and the ascertained probability is provided to a user as a return value.

In one specific embodiment of the method according to the present invention, the return value is calculated based on the formula $$p[\%] = 100 \cdot \left(1 - \frac{\sin(\Delta a)}{\sin(wc)}\right)$$

where p[%] is the return value provided to the user in percent, $\Delta a$ is a defined upper limit for an azimuth error, and we is the maximum possible azimuth angle error.

In this case, the defined upper limit for an azimuth error is in particular an accuracy criterion determined by the user.

The maximum possible azimuth angle error is in particular calculated based on the difference between a reference horizontal field determined during a compensation of the measuring device and a currently measured horizontal field, in particular based on the formula $$\sin(wc) = \frac{|(|b_{H\_ref}| - |b_H|)|}{|b_H|},$$

where $b_{H\_ref}$ is the reference horizontal field and $b_H$ is the measured horizontal field, which is calculated based on the formula $$|b_H| = |b_{H\_ref}| + |d|$$

where d is a deviation.

In another specific embodiment of the method according to the present invention, an automatic check is carried out by the measuring device within the scope of the safety check of whether the probability, that the estimated accuracy value meets a previously determined accuracy criterion, meets a previously determined probability criterion. If the probability criterion is met, the measuring device automatically provides a signal to an external receiver which includes at least information about the azimuthal orientation. However, if the probability criterion is not met, the measuring device automatically outputs a warning message to the user.

In one specific embodiment of this method, if the accuracy criterion is not met, a delay or prevention of the provision of the signal, or a request to the user to confirm the provision of the signal, is automatically carried out by the measuring device.

In another specific embodiment of this method, the warning message includes a request for the compensation of the measuring device, in particular wherein the measuring device automatically prevents a provision of a signal pending a compensation of the measuring device.

The signal includes in particular the estimated accuracy value, the accuracy criterion, and/or a direction and distance from a target ascertained by the measuring device. The external receiver is in particular a geographical information system (GIS), a military firing control post, or a handheld data processing device, for example a smartphone or a tablet computer.

In another specific embodiment of this method, the warning message to the user includes at least one warning signal in the form of an acoustic signal and/or a vibration alarm, in particular wherein the kind of warning signal is selectable by the user.

In another specific embodiment of this method, measured data, in particular including the azimuthal orientation, are displayed to the user on the measuring device. The warning message to the user then includes at least a display of the probability and/or the non-fulfillment of the probability criterion, wherein the expected accuracy and/or the non-fulfillment of the probability criterion are displayed instead of the measured data, or are displayed visually highlighted together with the measured data by the same display means of the measuring device as the measured data, in particular on the same display or reflected into the same optics of the measuring device, and in particular highlighted in color, blinking, as a graphical depiction, and/or superimposed on the measured data.

In one specific embodiment, the method according to the present invention includes a compensation of the measuring device before the determination of the azimuthal orientation, and a user-controlled determination of the accuracy criterion and/or the probability criterion. This user-controlled determination includes in particular a query of the accuracy criterion or probability criterion by the measuring device and an input of the accuracy criterion or probability criterion by the user.

The accuracy criterion includes in particular at least one accuracy threshold value, and the accuracy criterion is met if the expected accuracy reaches or exceeds the accuracy threshold value.

In one specific embodiment of the method according to the present invention, to obtain the measured data of the magnetic compass, the measuring device is set up with different azimuthal and zenithal orientation multiple times.

In another specific embodiment of the method according to the present invention, the estimated accuracy value is automatically determined by the measuring device for a compensation of magnetically hard and magnetically soft stray fields relating to the device itself, based on measured data of the magnetic compass.

A second aspect of the present invention relates to a handheld optoelectronic measuring device including an electronic magnetic compass for determining the azimuthal orientation of the measuring device, an interface for providing a signal, which includes information about the azimuthal orientation, for an external receiver, in particular a geographical information system, a military firing control post, or a handheld data processing device; and a safety component for ascertaining an accuracy of the azimuthal orientation to be determined, which is designed, being associated with the magnetic compass, in such a way that, based on measured data of the magnetic compass, an estimated accuracy value may be automatically determined by the measuring device. According to the present invention, the measuring device is designed, within the scope of a safety check of the safety component, to automatically ascertain a probability that the estimated accuracy value meets a previously determined accuracy criterion, and includes output means which are designed to provide the probability to a user as a return value.

In one specific embodiment, the measuring device according to the present invention is designed,
within the scope of the safety check, to automatically check whether the probability, that the estimated accuracy value meets a previously determined accuracy criterion, meets a previously determined probability criterion,
to provide the signal if the probability criterion is met, and
to output at least one warning message to the user if the probability criterion is not met.

In another specific embodiment, the measuring device according to the present invention includes an input unit for inputting the accuracy criterion and/or the probability criterion by a user, and a storage unit for storing the accuracy criterion and/or the probability criterion, in particular wherein the accuracy criterion is an accuracy threshold value, and the accuracy criterion is met by the estimated accuracy value in the case of falling below the accuracy threshold value.

In another specific embodiment, the measuring device according to the present invention includes a display unit for displaying measured data. The measured data in particular include the azimuthal orientation. In this case, the display unit is designed to display the expected accuracy and/or a non-fulfillment of the probability criterion instead of the measured data, or visually highlighted together with the measured data, in particular highlighted in color, blinking, as a graphical depiction, and/or superimposed on the measured data. In this case, the safety component is designed to automatically initiate an indication of the probability and/or non-fulfillment of the probability criterion via the display unit, if the automatic check has resulted in a non-fulfillment of the probability criterion.

In another specific embodiment, the measuring device according to the present invention includes a warning signal unit for outputting a warning signal as part of the warning message, wherein the warning signal unit includes at least
- an acoustic signal output device for outputting the warning signal in the form of acoustic signals which are perceptible to a user, and/or
- a vibration alarm signal provider for outputting the warning signal in the form of vibrations, which are perceptible to a user, in at least one part of the measuring device.

In this case, the kind of warning signal is preferably selectable by the user.

In one specific embodiment of the measuring device according to the present invention, the magnetic compass includes at least three measuring sensors fixed to the device for measuring a magnetic field and the direction of the gravitational field.

In one specific embodiment of the measuring device according to the present invention, a device, which is associated with the magnetic compass for compensating stray fields relating to the device itself, in particular both magnetically hard and magnetically soft stray fields, is provided.

In another specific embodiment of the measuring device according to the present invention, the safety component is designed in such a way that the accuracy may be automatically determined based on the measured data of multiple measurements at azimuthally and vertically different orientations of the measuring device.

Another aspect of the present invention relates to a computer program product including program code which is stored on a machine-readable carrier, for executing the method according to the present invention, in particular if the program is executed on an electronic data processing unit designed as a safety component of the measuring device according to the present invention.

BRIEF DESCRIPTION OF THE SEVERAL VIEWS OF THE DRAWINGS

The present invention is described in greater detail below based on figures.

DETAILED DESCRIPTION OF THE INVENTION

Figure 1:
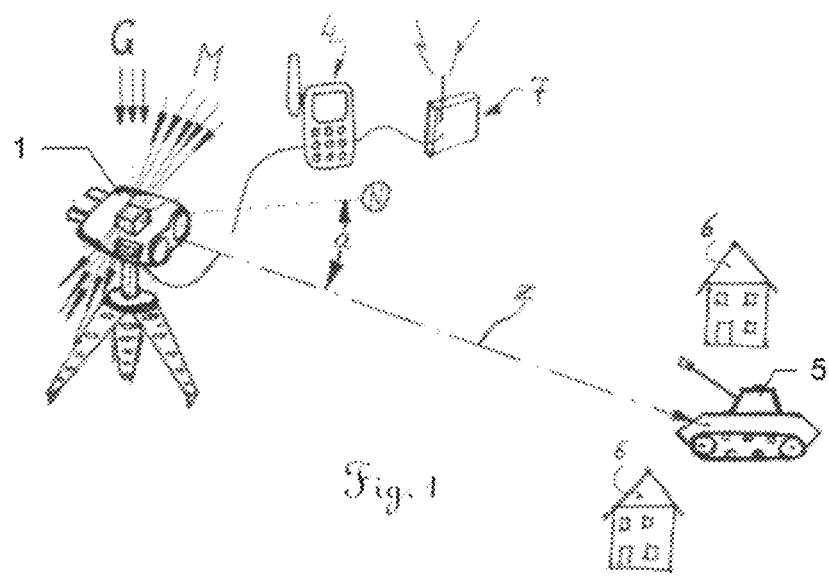
FIG. 1 schematically shows a measuring arrangement for determining target coordinates of a distant object by means of a measuring device including a magnetic compass on a tripod.

FIG. 1 shows a first measuring arrangement for determining target coordinates of a distant target object 5. The measuring arrangement includes a measuring device 1 which is fixed on a tripod 9 made up of non-magnetic material, a GPS receiver 4, and a transmission device 7. Here, the target object 5 is formed by a tracked vehicle which has taken up position next to a house 6.

A laser rangefinder and a digital magnetic compass 2 are integrated into the measuring device 1, which is designed here as sighting binoculars having a sighting axis Z. In contrast to the laser telemeter, the digital magnetic compass 2 is indicated by being drawn as a small cuboid within the binoculars. The azimuthal orientation a of the measuring device 1 relative to a theoretical north N and the zenithal orientation thereof relative to a perpendicular are determined by means of the digital magnetic compass 2, which in this case has three magnetic field sensors fixed to the device for the three-dimensional measurement of a magnetic field M and two tilt sensors for measuring the direction of the gravitational field G of the Earth.

In the case of the theoretical north N, the declination of the Earth's magnetic field from geographic north, which is position-dependent on a regional scale, is taken into account. This can be effected virtually automatically in a manner known per se by transmitting a declination value specific to the respective region from the GPS receiver 4 to the measuring device 1.

In addition to taking into account the correct declination value, a correct compensation of stray fields relating to the device itself is a basic requirement for a correct determination of the azimuthal orientation, since stray fields relating to the device itself are present in the immediate vicinity of the magnetic compass 2, and those changes in the stray fields of the device itself which are not taken into account can therefore cause considerable azimuthal errors. Stray fields relating to the device itself are also taken into account here in the theoretical north N.

Since, in the case of this measuring arrangement, the stray fields relating to the device itself are correctly compensated and no stationary stray fields of local scale are present in the vicinity of the measuring device 1, a substantially homogeneous magnetic field M is present, in which azimuthal orientations a relative to one another can be determined correctly without circular errors. This homogeneity is additionally increased by fixing the measuring device 1 on the tripod 9, since the magnetic compass 2 can be moved only within a very small measuring space of a few centimeters.

Stationary stray magnetic fields of regional scale which cause a constant azimuthal error can be detected and roughly estimated by means of one of the aforementioned methods for estimating the accuracy of azimuthal orientations a. In this method, at least one field parameter of the magnetic field M and the gravitational field G, in this case the magnetic inclination, is simultaneously provided by the digital magnetic compass 2 in a determination of an azimuthal orientation a. Since the measuring location in this case is known to the measuring device 1, for example via the GPS receiver 4, the measured magnetic inclination can be assessed automatically with the regional position-dependent magnetic inclination of a model of the Earth's magnetic field, in this case the IGRF model, in light of a specified threshold value, and an accuracy of the azimuthal orientation a can be established.

If the difference between the magnetic inclination measured during the determination of the azimuthal orientation a and the magnetic inclination of the IGRF model is significant in comparison with the threshold value, a stationary stray magnetic field of regional extent is present. In this case, the estimation of the accuracy of the azimuthal orientation a should be adjusted accordingly by the measuring device 1.

If, on the other hand, the difference is insignificant in comparison with the threshold value, no significant, stationary stray magnetic field of regional extent is likely to be present. Since, in addition, no stationary stray field of local scale is present here in the vicinity of the measuring device 1, and the declination and the stray fields relating to the device itself are correctly taken into account, according to a further method, the accuracy of azimuthal orientations a can be established according to a compensation accuracy. This results from the arithmetic compensation of stray fields relating to the device itself and represents a maximum limit for the achievable accuracy of azimuthal orientations a if stray fields relating to the device itself are present and these are compensated during the determination of azimuthal orientations a. In the case of the present measuring arrangement without stationary stray fields, the accuracy of azimuthal orientations a is determined to a good approximation by the compensation accuracy.

The arithmetic compensation of stray fields relating to the device itself is effected, according to DE 196 09 762 C1, by means of a vector equation whose parameters were determined by means of an optimization method. The optimization method is based on values of a specified sequence of measurements of the magnetic and gravitational fields M and G, in which sequence the measuring device 1 is in each case oriented differently in space at a measuring location p. The compensation accuracy is estimated with the aid of a method for statistical compensation calculation, which method is based on the values of the sequence of measurements, taking into account the established parameters of the vector equation.

After the azimuthal orientation a of the measuring device 1 aligned with the target object 5 has been determined, a signal which, inter alia, comprises the determined azimuthal orientation a and the estimated accuracy thereof is provided at an interface 3 of the measuring device 1. The signal provided is transmitted to the GPS receiver 4, taken into account there in the calculation of the target coordinates and the estimated accuracy thereof, and transmitted via the transmission device 7 to a firing control post (not depicted here). Instead of a military firing control post, the receiver may also be a geographical information system (GIS) or another data processing system or device, in particular a handheld smartphone or a tablet computer, in particular in civil applications.

On the basis of the method implemented in the measuring device 1 for estimating the accuracy of the azimuthal orientation a, the accuracy can be estimated in a relatively reliable manner. Consequently, possible collateral damage to the house 6 can be recognized in good time in the event of firing activity planned in relation to the target coordinates.

Figure 2:
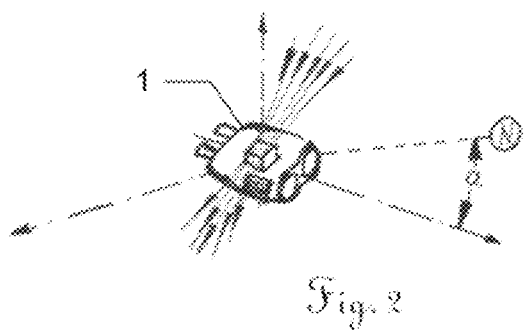
FIG. 2 schematically shows a method in which the measuring device from FIG. 1 is differently azimuthally oriented three times.

FIG. 2 shows the measuring device 1 from FIG. 1, by means of which a further method for estimating the accuracy of azimuthal orientations a is carried out. This method for estimating the accuracy of azimuthal orientations a is based on an assessment of the accuracy of the compensation of stray fields relating to the device itself and is suitable, for example, for tripod-based measuring devices according to FIG. 1.

In this method, three control measurements of the magnetic and gravitational fields M and G are carried out with the digital magnetic compass 2 at the same measuring location P. The measuring device 1 is oriented azimuthally differently in space in each case, in a three-part cycle. In each control measurement, at least one field parameter, for example the horizontal field strength here, is measured. Once the parameters of the vector equation for compensation of stray fields relating to the device itself have been correctly determined, the horizontal field strength in the control measurements must be substantially the same in each case, in particular independently of stationary stray fields of regional or local extent.

The differences between the respective horizontal field strengths contain information about a change in stray fields relating to the device itself between the time of establishing the parameters and the control measurements. If these differences are again assessed in relation to the horizontal field strength at the measuring location, information about possible effects on a determination of the azimuthal orientation a may also be obtained. The arc tangent of the quotient of the respective difference between different horizontal field strengths divided by the mean of the horizontal field strengths is a measure of the effects on a possible error of the azimuthal orientation a. The achieved accuracy of compensation of stray fields relating to the device itself can thus be estimated. Thus, for example, the same difference between horizontal field strengths results in twice the azimuthal error in Finland as in Switzerland.

If the differences or the aforementioned quotients are put in relation to a specified threshold value, the estimated value of the accuracy must be correspondingly reduced when the threshold value is exceeded. Alternatively, the measuring device 1 can propose to the user to determine the parameters of the vector equation for the arithmetic compensation of stray magnetic fields relating to the device itself at the measuring location P via the specified sequence of measurements, for example via a so-called twelve-point compensation.

Of course, by taking into account further field parameters of the magnetic and gravitational fields M and G, for example the vertical field strength or the ratio of horizontal field strength to vertical field strength, the quality of the estimation of the accuracy can be improved.

Figure 3:
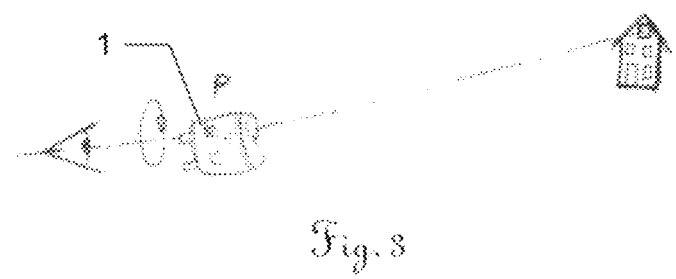
FIG. 3 schematically shows a method in which the measuring device from FIG. 1 is tilted three times differently about its sighting axis.

FIG. 3 shows an alternative specific embodiment of a method according to the invention for estimating the accuracy of azimuthal orientations a from FIG. 2, which is likewise based on an assessment of the accuracy of the compensation of stray fields of the measuring device 1 which relate to the device itself. This specific embodiment is suitable primarily for handheld measuring devices.

In contrast to the method from FIG. 2, the measuring device 1 in this specific embodiment is oriented so that its sighting axis Z points to a fixed measuring point, in this case the house 6. In this specific embodiment, in the three control measurements of the magnetic and gravitational fields, the measuring device 1 is tilted in each case differently about the sighting axis Z in a three-part cycle. Three control measurements are thus carried out with the digital magnetic compass 2 at the same measuring location P, in which measurements the measuring device has the same azimuthal alignment with the house 6.

For example, in addition to the method from FIG. 2, the differences between the respective product of the horizontal field strength and the sine of the azimuthal orientation a and/or the product of the horizontal field strength and of the cosine of the azimuthal orientation a can thus be put in relation to a further threshold value. On the basis of this additional measurement information, the effects on the accuracy in the determination of azimuthal orientations a can be even more reliably estimated.

Figure 4:
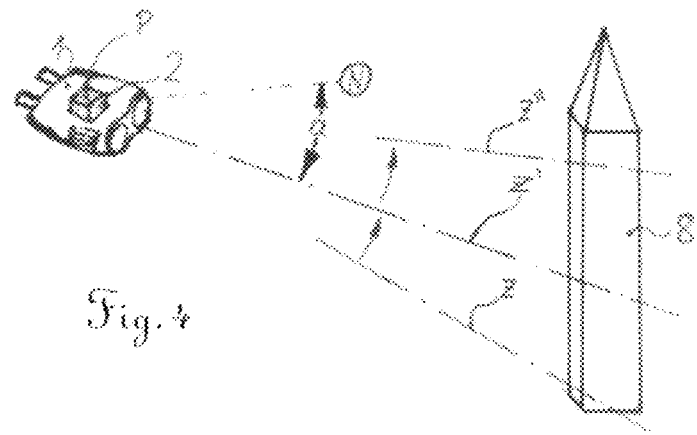
FIG. 4 schematically shows a method in which the measuring device from FIG. 1 is set up with different zenith orientation three times.

FIG. 4 shows a modified specific embodiment of the method for estimating the accuracy from FIG. 3, which method is likewise based on an assessment of the accuracy of the compensation of stray fields of the measuring device 1 which relate to the device itself.

In contrast to the method from FIG. 3, here the measuring device 1 is oriented differently in the three control measurements of the magnetic and gravitational fields, in each case such that the three differently inclined sighting axes Z, Z' and Z" intersect the same perpendicular. This perpendicular can, as shown here, be embodied by an edge of a tower 8. Three control measurements are thus carried out with the digital magnetic compass 2 at the same measuring location P, in which the measuring device 1 has the same azimuthal orientation a toward the edge of the tower 8. This information can advantageously be taken into account in estimating the accuracy, comparably with the method of FIG. 3. It is also conceivable for the methods of FIGS. 2 to 4 to be combined with one another.

Figure 5:
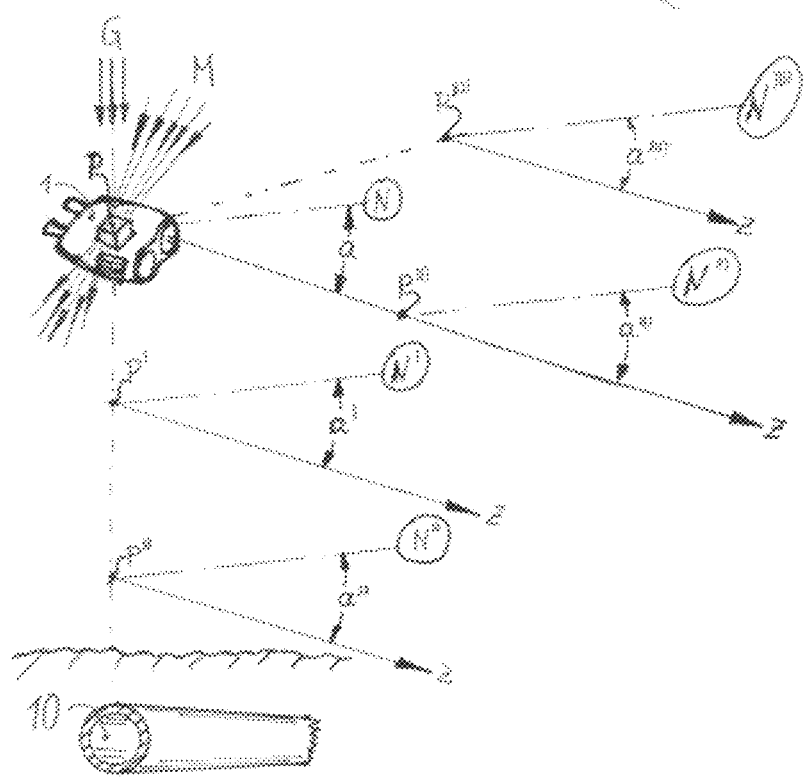
FIG. 5 schematically shows methods in which the measuring device is aligned with the same measuring point at a plurality of measuring locations adjacent to one another measurements.

FIG. 5 shows the measuring device 1 for FIGS. 1 to 4 above a buried cast iron pipe 10. Further methods for estimating the accuracy of azimuthal orientations a, which are based on an assessment of the effects of stationary stray magnetic fields of local scale, are carried out by means of the measuring device 1.

In this method, in multiple measurements, the measuring device 1 is aligned via its sighting axis Z with the same measuring point (not shown here), for example, the house 6 from FIG. 3, at different measuring locations P, P' or P", P or P''', and P or P'''', which are adjacent to one another. However, it would also be conceivable in this method, comparably with the control measurements of FIG. 4, to align the measuring device 1 with a perpendicular edge at a different height in each case, since the azimuthal orientation a for the measurements of these methods is also constant in this way.

These methods for estimating the accuracy of azimuthal orientations a are based on a direct check of azimuthal orientations a in the direct vicinity of the measuring location P. In contrast to the methods of FIG. 1, in these methods, not only are field strength values of magnetic fields M and gravitational fields G related to one another, but the magnitude of the azimuthal orientation a is directly determined, the accuracy of which orientation is automatically estimated by the measuring device 1 using the aforementioned methods.

Inhomogeneities of the magnetic field M caused by stationary stray fields of local scale, in this case by the cast iron pipe 10, can be detected by means of these methods, and the effect on a determination of azimuthal orientations a can be roughly estimated. Stationary stray fields of regional scale or changes in stray fields relating to the device itself have no effect on these methods and cannot be detected by them.

It is advantageous if the target object whose azimuthal orientation is to be determined, and the measuring point with which the sighting axis Z is aligned in these methods, have similar azimuthal orientations.

In one specific embodiment of these methods for estimating the accuracy of azimuthal orientations a, for example, the measuring device 1 requests that the sighting axis Z be aligned with the same measuring point in each case, first standing at the measuring location P, then kneeling at the first further measuring location P', and finally lying at the second further measuring location P". Since the magnetic field M within the large measuring space here, easily one and a half meters in size, is markedly inhomogeneous owing to the stray field caused by the cast iron pipe 10, the different measuring locations P, P', and P" have in each case different theoretical north directions N, N', and N", with the result that different azimuthal orientations a, a', and a" are determined despite the same measuring point. On the basis of these different azimuthal orientations a, a', and a", an accuracy for a determination of azimuthal orientations a at the measuring location P can be estimated by the measuring device 1 by means of a computational method.

This is particularly suitable for buried stray fields, since the measurements in the decisive effective direction of buried stray fields are thereby carried out. Buried stray fields are also a significant source of errors in the determination of azimuthal orientations, since, in contrast to stray magnetic fields on the surface, they generally cannot be perceived.

In a further specific embodiment of these methods, a third further measuring location P''' is sought after a measurement at the measuring location P by taking a step in the direction of the sighting axis Z, and a second measurement is carried out there. Consequently, it is possible to obtain information about effects of the stray field of the cast iron pipe 10 in a further spatial dimension.

In a further specific embodiment, a fourth further measuring location P'''' is sought after the measurement at the measuring location P by taking a step perpendicularly to the sighting axis Z, and the second measurement to the measuring point, which is advantageously far away in this case, is carried out. Information about effects of the stray field of the cast iron pipe 10 can thus also be obtained in the third spatial dimension.

Figure 6:
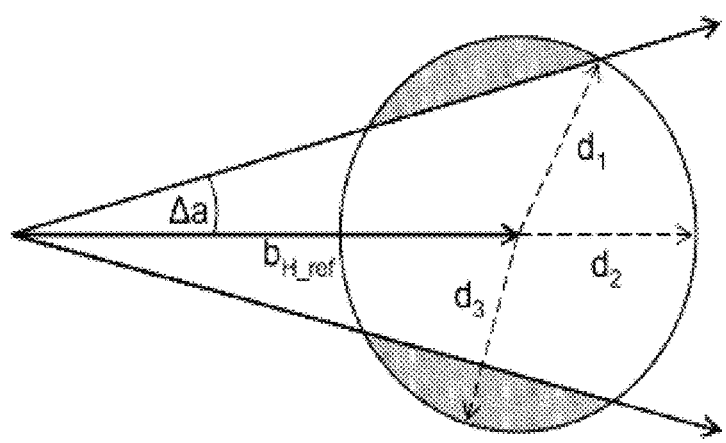
FIG. 6 schematically shows the calculation of a probability that a disturbance has negatively affected an azimuth measurement.

FIG. 6 illustrates a calculation of a probability value within the scope of the method according to the present invention, by way of example. The horizontal reference field $b_{H\_ref}$ determined within the scope of the compensation of the device, three exemplary possible disturbances $d_1$, $d_2$, $d_3$, and the error threshold value $\Delta a$ as an accepted error upper limit (in particular determined by a user), are schematically depicted.

In methods known from the related art for calculating and depicting an expected accuracy, a certain accuracy threshold value is guaranteed to the user, for example, a maximum possible deviation from a target value. However, a one hundred-percent guarantee of a certain threshold value of the azimuth measurements is de facto not possible. According to the present invention, no such threshold values, but rather probabilities, are therefore calculated. Such a probability value has the advantage that the user is able to effectuate a better approach to the expected accuracy.

In order to calculate the probability value, a certain upper limit must previously be determined using the maximum error threshold value $\Delta a$ which an azimuth error is allowed to have. This may, for example, be carried out via an input by the user. If a measurement is carried out after the input of the error threshold value $\Delta a$, the return value of the compass provides information about how high the probability is that the measuring result lies within the set error threshold value $\Delta a$. This return value is calculated using the formula $$p[\%] = 100 \cdot \left(1 - \frac{\sin(\Delta a)}{\sin(wc)}\right)$$

where p[%] is the probability in percent indicated to the user as the return value, $\Delta a$ is the error threshold value input by the user, and wc is the maximum possible azimuth angle error (wc=worst case). Using this formula, a calculation is thus made of how high the probability is that a disturbance has negatively affected the azimuth measurement in the worst case.

In this case, the error threshold value $\Delta a$, which represents the maximum accepted azimuth angle error, is, for example, determined by the user. The maximum possible azimuth angle error wc may preferably be calculated based on the difference between the horizontal reference field $b_{H\_ref}$ and the currently measured horizontal field $b_H$:

$$\sin(wc) = \frac{|(|b_{H\_ref}| - |b_H|)|}{|b_H|}.$$

The field which was previously determined during the compensation of the device is considered to be the reference horizontal field $b_{H\_ref}$. Based on the reference horizontal field $b_{H\_ref}$ and under the assumption that a disturbance d points in an unknown direction, the following applies to the horizontal field $b_H$:

$$|b_H| = |b_{H\_ref}| + |d|.$$

If we now consider FIG. 6, it is apparent that in the shaded circle segments, the maximum allowed azimuth error is greater than is determined by the user via the error threshold value $\Delta a$. Assuming that the directions of the possible disturbances $d_1$, $d_2$, $d_3$ are equally distributed, it is possible to state that the probability of a sufficiently correct measurement is provided by the ratio of the non-shaded circle area to the total circle area. In FIG. 6, the probability of a sufficiently correct measurement is thus not provided only with $d_3$. In general, it may be noted here that in the case of a change in the horizontal field strength, there is a certain probability that an azimuth error occurs. In addition, it may be inferred from the depiction that there are cases in which $b_H$ is greater than $b_{H\_ref}$ but no azimuth error exists; this is, for example, the case with $d_2$, where the following applies:

$$|b_H| = |b_{H\_ref}| + |d|.$$

Optionally, the change in the vertical component $b_v$ of the magnetic field is also incorporated into the calculation of the maximum possible angle error wc:

$$\sin(wc) = \frac{\sqrt{(|b_{H\_ref}| - |b_H|)^2 + (|b_{V\_ref}| - |b_V|)^2}}{|b_H|}.$$

Figure 7:
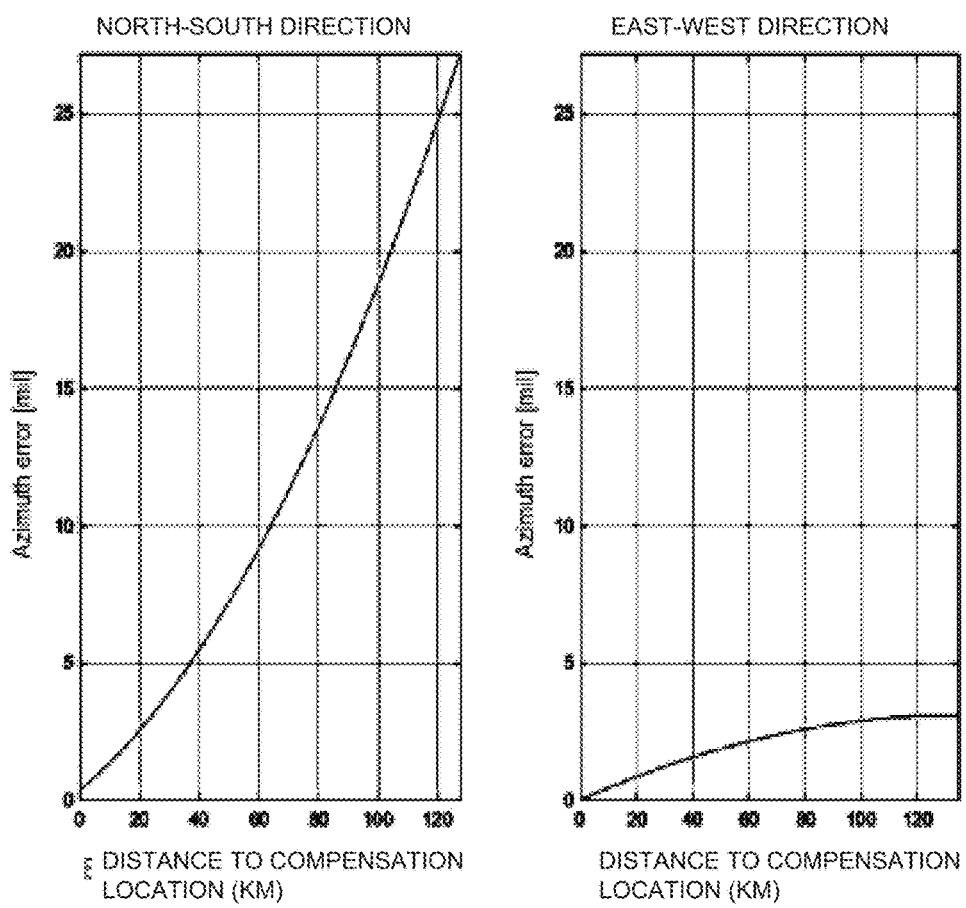
FIG. 7 schematically shows two diagrams for depicting the increase of azimuth errors with increasing distance from the compensation location.

FIG. 7 shows two diagrams depicting how the azimuth error develops if one moves from a position in the middle latitudes in the north-south direction or the east-west direction. The calculation is based on the data of the IGRF model. If one moves locally away from the compensation location, the measuring device must once again be compensated. According to one specific embodiment of the present invention, the user is warned if he/she must carry out a new compensation.

Figure 8:
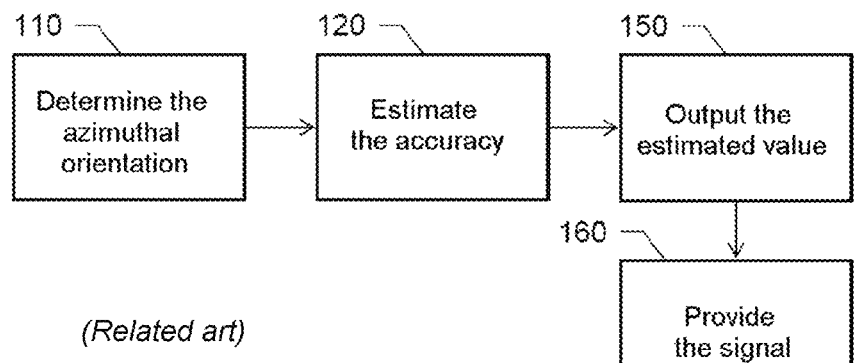
FIG. 8 schematically shows a flow chart for illustrating a method for monitoring the accuracy according to the related art.

FIG. 8 shows a simplified flow chart of the major steps of a method for monitoring the accuracy of the orientation of a portable measuring device according to U.S. Pat. No. 7,325,320 B2. The method shown comprises the following steps:

the azimuthal orientations of the compensated device are determined (110) by measuring magnetic and gravitational fields via an electronic magnetic compass;

subsequently, a value of the accuracy is estimated (120) automatically by the measuring device;

this estimated value is provided (150) to the user; and finally, a signal including information about the azimuthal orientation, and possibly additional measured data and/or the estimated value, is provided (160) to an interface of the measuring device, for example, for forwarding to a geographical information system or a military firing control post.

Figure 9A:
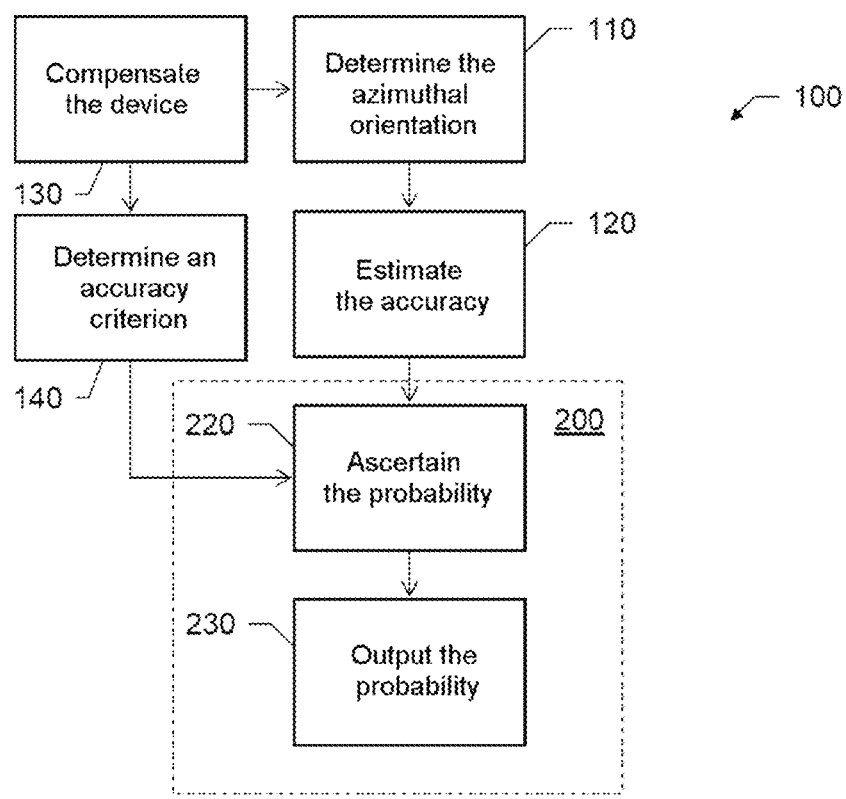
FIGS. 9a and 9b schematically show two flow charts for illustrating one exemplary method according to the present invention in each case.
Figure 9B:
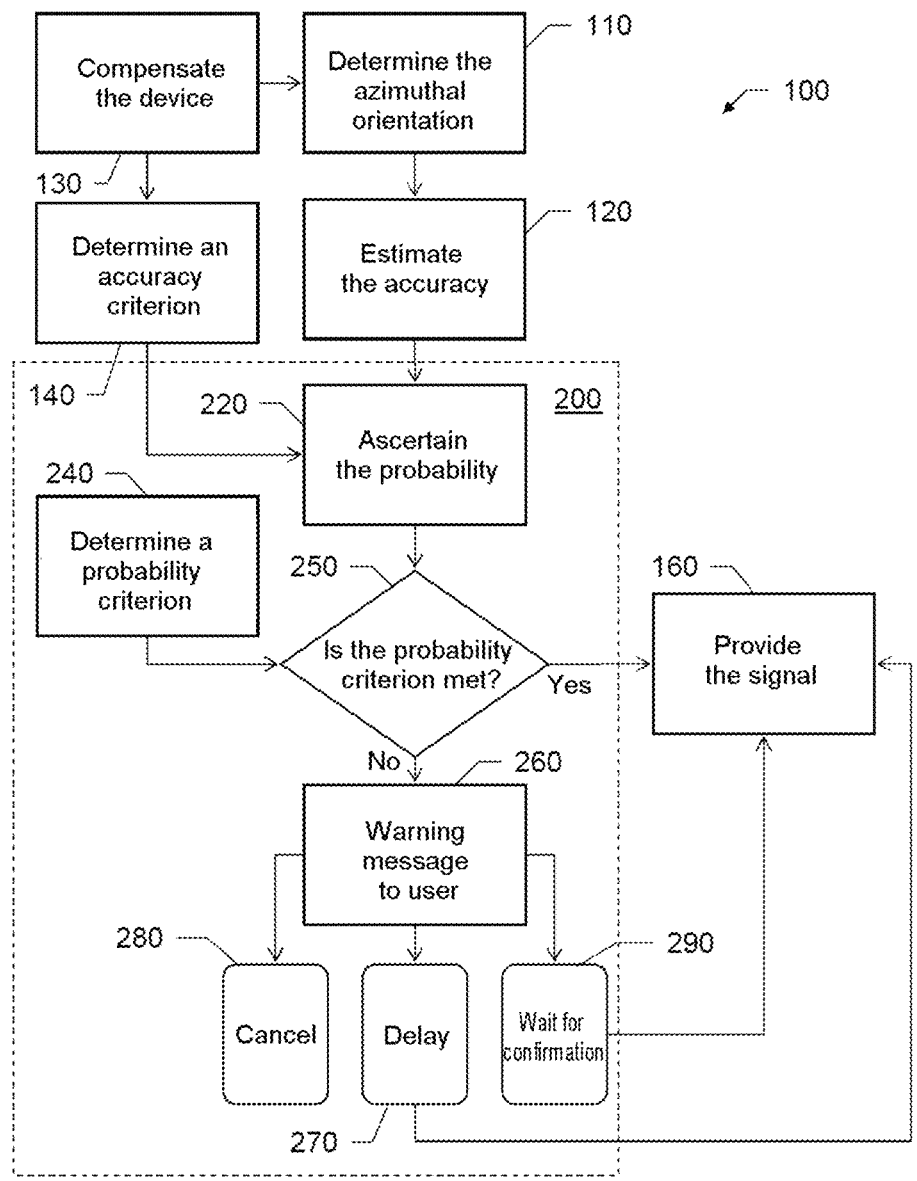

FIGS. 9a and 9b respectively show a flow chart of an exemplary specific embodiment of a method 100 according to the present invention.

FIG. 9a illustrates a first exemplary specific embodiment of the method 100 according to the present invention. According to this simple specific embodiment of the method, the user initially carries out a compensation 130 of the measuring device or its integrated digital compass on-site, wherein a reference field is ascertained. Subsequently, an accuracy criterion is established 140 by the user. The accuracy criterion is in particular a situation-dependent threshold value (or range) for the azimuthal accuracy to be ascertained. The user may of course also determine the accuracy criterion before the compensation. Alternatively, a specified value may be hard-coded in the device. In step 110, an azimuthal orientation of the device is determined using the compensated device, for example with respect to a measurement to a distant target. Subsequently, in step 120, the accuracy is automatically estimated by the device.

According to the present invention, the method 100 includes a safety check 200. In this case, it is automatically ascertained 220 by the measuring device how high the probability is that an estimated accuracy value ascertained in step 120 meets the accuracy criterion determined in step 140. This may be carried out in particular as depicted with reference to FIG. 6. Finally, the ascertained probability is then provided 230 to a user as a return value.

FIG. 9b illustrates a second exemplary specific embodiment of the method 100 according to the present invention. In this case, the steps 110, 120, 130 and 140 are initially carried out, similarly to the first specific embodiment from FIG. 9a. In this specific embodiment, in addition, in step 160, a signal including measured data is output via an interface of the device. Prior to this, according to the present invention, the device automatically carries out a safety check 200.

Within the scope of this safety check 200, as in the first specific embodiment, it is initially automatically ascertained 220 via the device how high the probability is that an estimated accuracy value ascertained in step 120 meets the accuracy criterion determined in step 140. In addition, a probability criterion is provided 240. Like the accuracy criterion, this may be determined by the user or hard-coded in the device. Subsequently, a check 250 is carried out of whether the ascertained probability meets this criterion, for example, whether the probability is above a threshold value or range determined by the user, i.e. in particular whether the ascertained probability is high enough for the present measurement purpose. If this is the case, the signal is provided 160 as intended; if not, at least one warning message is initially given to the user 260, wherein the ascertained probability may optionally be provided as a return value within the scope of the warning message.

The warning message 260 is preferably designed in such a way that it can neither be overlooked by an inexperienced user nor simply ignored by an experienced user. In addition to visual warning signals such as illuminated LEDs, acoustic signals, for example beeps or spoken warning messages, or a vibration alarm, are also possible, depending on the field of application of the device. Preferably, the type, duration, and intensity of the warning signal may be adjustable by the user. If the measured data are displayed to the user on a screen of the device or a control panel, or are reflected into optics of the device, the warning message 260 may preferably be displayed to the user on the same display device as the measured data (this is shown in FIGS. 11a to 11e).

The established accuracy criterion may, for example, be a threshold value which, for example, defines a maximum allowed upper error limit. If the user carries out a measurement using the displayed method, the user receives as a warning message 260, for example, a percentage value which indicates to the user how high the probability is that the user's measurement has reached (or not reached) the set threshold value. The calculation is based on a comparison between the current horizontal field and the reference field which was calculated during the compensation.

In this case, the warning message 260 may completely or temporarily replace the display of the measured data, or the warning message is visually highlighted together with the measured data. For this purpose, the warning message may, for example, be displayed blinking, highlighted in color, or as a large-area graphical depiction. The warning message may also be displayed in a pop-up window which is optionally completely or partially superimposed on the measured data.

In addition to the output of a warning message 260, in the method shown here, the measuring device also intervenes in the provision 160 of the signal. Three exemplary alternatives are depicted. On the one hand, the device may effect a delay 270 of the signal, in order to give the user the option of responding to the warning signal, for example, in order to decide independently whether or not the signal should be provided. On the other hand, the device may effect a cancellation 280 of the measurement, so that no signal is transmitted. In addition, the device may ask the user to make a decision and postpone the transmission of the signal pending the confirmation 290.

For example, the warning message 260 may include a request to the user to carry out a new compensation 130 of the device. In one specific embodiment, the device may deny the provision 160 of data until the user has carried out this compensation 130.

Preferably, multiple alternatives may be available. For example, in a menu of the device, the user may select from the three depicted alternatives 270, 280, 290, or others.

In one specific embodiment of the method, the user chooses a threshold range, i.e., at least one upper and one lower threshold value, as the probability criterion. The warning signal may then, for example, be depicted by a traffic signal. If the ascertained probability is below the threshold range, the warning signal may then, for example, comprise a red signal; if it is in the threshold range, a yellow signal; and if it is above it, a green signal. The kind of intervention may also be correspondingly adapted. For example, a cancellation 280 may automatically occur if the ascertained probability falls below the threshold range, and a query 290 of a user confirmation may occur if the ascertained probability is between the two threshold values. Alternatively, the query takes place in the case of falling below the threshold range, and if the threshold range is reached, only the warning message 260 is given, possibly linked to an automatic delay 270.

Figure 10:
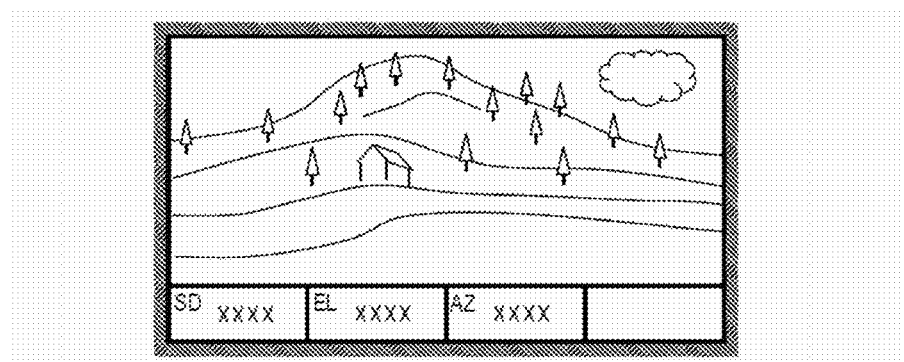
FIG. 10 schematically shows an exemplary depiction of measured data on a display unit of the measuring device.

FIG. 10 shows a display unit (display) of the measuring device 1. The display may be integrated into the measuring device 1 or may be part of an external operating unit of the measuring device 1. The display displays measured data and other information, here as an example, an image of a surveillance camera of the measuring device. In the lower area, inter alia, a display field is provided for the azimuthal orientation of the measuring device ascertained by the magnetic compass (field "AZ").

In FIGS. 11a to 11e, various options are displayed, in order to display a warning message in a visually highlighted manner in such a way that it is not overlooked by a user.

Figure 11A:
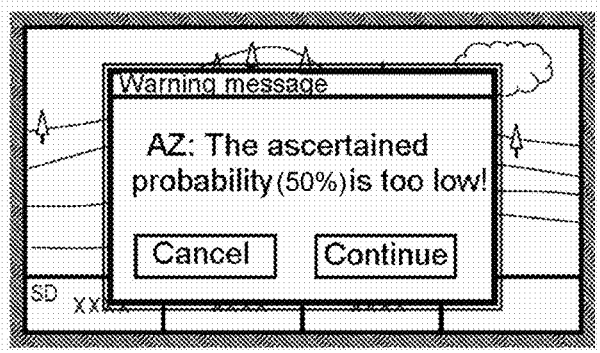
FIGS. 11a to 11e schematically show exemplary warning messages in the depiction from FIG. 10.

FIG. 11a displays the warning message in the form of a pop-up window which is superimposed on the measured data and the rest of the display to a large extent. The window must be actively closed by the user. In this example, the expected accuracy is displayed together with the warning message, and the user has the choice of canceling the action, for example in order to compensate the device again, or to continue and thus to accept the value despite the warning message and to trigger the provision of a signal.

Figure 11B:
Figure 11C:
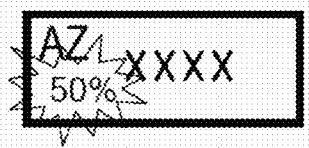
Figure 11D:
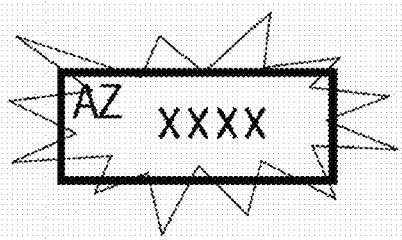
Figure 11E:
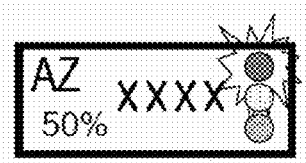

FIGS. 11b, 11c, 11d, and 11e depict only the display field for the azimuthal orientation of the measuring device ascertained by the magnetic compass. In FIG. 11b, this field is highlighted (depicted here as shaded) in color by a signal color, for example, bright red. In FIG. 11c, a value for the ascertained probability (here, for example, "50%"), which is visually highlighted for the user by a blinking of the percent value, is additionally displayed in the display field. In FIG. 11d, the entire display field is depicted as blinking. In FIG. 11e, on the one hand, a value for the ascertained probability is displayed, and on the other hand, a traffic light having a red, yellow, and green field. If (as shown here) the probability falls below a lower probability threshold value (for example 75%), the red field illuminates; if the probability falls below an upper probability threshold value (for example 90%), but not the lower one, the yellow field illuminates; and if the probability criterion is met, the green field illuminates.

The variants shown are purely exemplary; the warning may also occur via other, for example graphical depictions, for example a scale with a bar. Likewise, various combinations of these depictions are also conceivable.

Likewise, for providing support, or instead of the visual depiction of the warning message, other non-visual signals may be output depending on the application area, in particular acoustic signals or a vibration alarm. A vibration alarm may be advantageous in particular in military applications, if visual or acoustic signals could give away one's own position.

It is to be understood that these depicted figures only schematically depict possible exemplary embodiments. The various approaches may also be combined with each other, as well as with methods and devices of the related art.

The invention claimed is:

1. A method for monitoring an accuracy of an azimuthal orientation of a handheld optoelectronic measuring device comprising:
   determining the azimuthal orientation using an electronic magnetic compass;
   automatically ascertaining an estimated accuracy value by the handheld optoelectronic measuring device based on measured data of the electronic magnetic compass, including a safety check, which includes:
      automatically ascertaining a probability that the estimated accuracy value meets a previously determined accuracy criterion, by the handheld optoelectronic measuring device, and
      providing the ascertained probability to a user as a return value,
   wherein the probability is calculated based on a formula $$p[\%] = 100 \cdot \left(1 - \frac{\sin(\Delta a)}{\sin(wc)}\right)$$

where p[%] is the probability provided to the user in percent, Δa is a defined upper limit for an azimuth error, and wc is the maximum possible azimuth angle error.

2. The method according to claim 1, wherein the defined upper limit for the azimuth error is an accuracy criterion determined by the user.

3. The method according to claim 1, further comprising:
   automatically checking, by the handheld optoelectronic measuring device within the safety check, whether the probability, that the estimated accuracy value meets a previously determined accuracy criterion, meets a previously determined probability criterion,
   wherein if the probability criterion is met, the handheld optoelectronic measuring device automatically provides a signal to an external receiver which includes at least information about the azimuthal orientation, and if the probability criterion is not met, the handheld optoelectronic measuring device automatically outputs a warning message to the user.

4. The method according to claim 3, wherein, if the probability criterion is not met, a delay or prevention of the provision of the signal, or a request to the user to confirm the provision of the signal, is automatically carried out by the handheld optoelectronic measuring device.

5. The method according to claim 3, wherein the warning message to the user includes at least one warning signal in the form of an acoustic signal and/or a vibration alarm, wherein the at least one warning signal is selectable by the user.

6. The method according to claim 3, wherein measured data, including the azimuthal orientation, are displayed to the user on the handheld optoelectronic measuring device, wherein the warning message to the user includes at least a display of the ascertained probability and/or a non-fulfillment of the probability criterion, and wherein the ascertained probability and/or the non-fulfillment of the probability criterion:
   are displayed instead of the measured data, or
   are displayed visually highlighted together with the measured data by the same display of the handheld optoelectronic measuring device as the measured data, on the same display or reflected into the same optics of the handheld optoelectronic measuring device, including:
      highlighted in color,
      blinking,
      as a graphical depiction, and/or
      superimposed on the measured data.

7. The method according to claim 3, wherein, if the probability criterion is not met, the warning message includes a request for a compensation of the handheld optoelectronic measuring device.

8. The method according to claim 7, wherein the handheld optoelectronic measuring device automatically prevents a provision of a signal pending a compensation of the handheld optoelectronic measuring device.

9. The method according to claim 3, wherein
   the signal includes the estimated accuracy value, the accuracy criterion, and/or a direction and distance from a target ascertained by the handheld optoelectronic measuring device; and/or
   the external receiver is a geographical information system, a military firing control post, or a handheld data processing device.

10. The method according to claim 1, further comprising:
    determining a compensation of the handheld optoelectronic measuring device before the determination of the azimuthal orientation, and
    a user-controlled determination of an accuracy criterion and/or a probability criterion, including a query of the accuracy criterion and/or the probability criterion by the handheld optoelectronic measuring device, and an input of the accuracy criterion and/or the probability criterion by a user of the handheld optoelectronic measuring device, wherein the accuracy criterion includes at least one accuracy threshold value, and the accuracy criterion is met if an expected accuracy reaches or exceeds the accuracy threshold value.

11. The method according to claim 1, wherein,
    to obtain the measured data of the electronic magnetic compass, the handheld optoelectronic measuring device is set up with different azimuthal and zenithal orientation multiple times, and/or
    the estimated accuracy value is automatically ascertained by the handheld optoelectronic measuring device for a compensation of magnetically hard and magnetically soft stray fields relating to the device itself, based on measured data of the electronic magnetic compass.

12. The method according to claim 1, wherein the maximum possible azimuth angle error is calculated based on a difference between a reference horizontal field determined during a compensation of the handheld optoelectronic measuring device and a currently measured horizontal field.

13. The method according to claim 12, wherein the maximum possible azimuth angle error is calculated based on a formula $$\sin(wc) = \frac{|(|b_{H\_ref}|-|b_H|)|}{|b_H|},$$

where $b_{H\_ref}$ is the reference horizontal field and $b_H$ is the measured horizontal field, which is calculated based on a formula $$|b_H|=|b_{H\_ref}|+|d|$$

where d is a deviation.

14. A handheld optoelectronic measuring device including
an electronic magnetic compass for determining an azimuthal orientation of the handheld optoelectronic measuring device,
an interface for providing a signal, which includes information about the azimuthal orientation, for an external receiver, a geographical information system, a military firing control post, or a handheld data processing device, and
a safety component for ascertaining an accuracy of the azimuthal orientation to be determined, which is designed, being associated with the electronic magnetic compass, in such a way that, based on measured data of the electronic magnetic compass, an estimated accuracy value is automatically ascertainable by the handheld optoelectronic measuring device,
wherein the handheld optoelectronic measuring device is designed, within a scope of a safety check of the safety component, to automatically calculate a probability that the estimated accuracy value meets a previously determined accuracy criterion, and
includes output means which are designed to provide the probability to a user as a return value,
wherein the probability is calculated based on a formula $$p[\%] = 100 \cdot \left(1 - \frac{\sin(\Delta a)}{\sin(wc)}\right)$$

where p[%] is the probability provided to the user in percent, $\Delta a$ is a defined upper limit for an azimuth error, and we is the maximum possible azimuth angle error.

15. The handheld optoelectronic measuring device according to claim 14, wherein the handheld optoelectronic measuring device is designed,
within the scope of the safety check, to automatically check whether the probability, that the estimated accuracy value meets a previously determined accuracy criterion, meets a previously determined probability criterion,
to provide the signal if the probability criterion is met, and
to output at least one warning message to the user if the probability criterion is not met.

16. The handheld optoelectronic measuring device according to claim 15, further comprising a display unit for displaying measured data, including the azimuthal orientation, wherein the display unit is designed to display an expected accuracy and/or a non-fulfillment of the probability criterion
instead of the measured data, or
visually highlighted together with the measured data, including
highlighted in color,
blinking,
as a graphical depiction, and/or
superimposed on the measured data, and
wherein the safety component is designed to automatically initiate an indication of the probability and/or the non-fulfillment of the probability criterion via the display unit, if the automatic check has resulted in a non-fulfillment of the probability criterion.

17. The handheld optoelectronic measuring device according to claim 15, further comprising a warning signal unit for outputting a warning signal as part of the warning message, wherein the warning signal unit includes at least
an acoustic signal output device for outputting the warning signal as acoustic signals which are perceptible to a user, and/or
a vibration alarm signal provider for outputting the warning signal as vibrations, which are perceptible to a user, in at least one part of the handheld optoelectronic measuring device,
wherein the warning signal is selectable by the user.

18. The handheld optoelectronic measuring device according to claim 14, further comprising:
an input unit for inputting an accuracy criterion and/or a probability criterion by a user, and
a storage unit for storing the accuracy criterion and/or the probability criterion,
wherein the accuracy criterion is an accuracy threshold value, and the accuracy criterion is met by the estimated accuracy value in a case of falling below the accuracy threshold value.

19. The handheld optoelectronic measuring device according to claim 14, wherein
the electronic magnetic compass includes at least three measuring sensors fixed to the device for measuring a magnetic field and the direction of the gravitational field,
a device, which is associated with the electronic magnetic compass for compensating stray fields relating to the device itself, both magnetically hard and magnetically soft stray fields, is provided, and/or
the safety component is designed in such a way that the accuracy may be automatically determined based on the measured data of multiple measurements at azimuthally and vertically different orientations of the handheld optoelectronic measuring device.

20. A computer program product including program code which is stored on a non-transitory machine-readable carrier, the program being executed on an electronic data processing unit designed as a safety component of a handheld optoelectronic measuring device, the computer program product comprising:
program code for determining, using an electronic magnetic compass, an automatic ascertainment of an estimated accuracy value by the handheld optoelectronic measuring device based on measured data of the electronic magnetic compass,
program code for performing a safety check, including:
program code for automatically ascertaining a probability that the estimated accuracy value meets a previously determined accuracy criterion, the handheld optoelectronic measuring device, and
program code for providing the ascertained probability to a user as a return value, wherein the probability is calculated based on a formula $$p[\%] = 100 \cdot \left(1 - \frac{\sin(\Delta a)}{\sin(wc)}\right)$$

where p[%] is the probability provided to the user in percent, $\Delta a$ is a defined upper limit for an azimuth error, and wc is the maximum possible azimuth angle error.

* * * * *